March 20, 1962 F. H. GRADY 3,025,715

TRANSMISSION CONTROL

Filed Sept. 13, 1960

INVENTOR.
Francis H. Grady
BY
A. M. Heiter
ATTORNEY 3,025,715
Patented Mar. 20, 1962

3,025,715
TRANSMISSION CONTROL
Francis H. Grady, Pontiac, Mich., assignor to General Motors Corporation, Detroit, Mich., a corporation of Delaware
Filed Sept. 13, 1960, Ser. No. 55,679
9 Claims. (Cl. 74—484)

This invention relates to a control linkage and more particularly to an improved transmission control linkage selectively connecting a rotatably and reciprocally actuated control to a pair of transmission control levers.

In transmission control linkages mounted on the steering column of the vehicle, the hand lever located beneath the steering wheel is connected to rotate and reciprocate a control tube mounted coaxially of the steering column. At the lower end of the steering column a pair of levers are rotatably mounted about the control tube and a clutch mechanism selectively connects the control tube to either lever so that the lever can be rotated with the control tube. In accordance with this invention, in order to provide a strong rotary support for the levers and to eliminate excessive friction on the control tube, the levers are rotatably mounted on bearing rings supported on the steering column to provide a larger diameter bearing support for the control levers and to eliminate a sliding friction in the contact between the levers and the control tube.

An object of the invention is to provide a transmission control linkage having a control member mounted within a support tube, a pair of control levers rotatably mounted on bearing rings supported on the support tube, and a clutching mechanism selectively clutching the control member to each lever.

Another object of the invention is to provide in a transmission control linkage having a control member rotatably and reciprocally supported within a support column, a pair of levers having annular bearing means surrounding the control member and rotatably supported on the bearing rings located within the support column and a clutching mechanism selectively connecting the control member to each of the levers.

These and other objects of the invention will be more apparent from the following description and drawing of the preferred embodiment of the invention.

Figure 1:
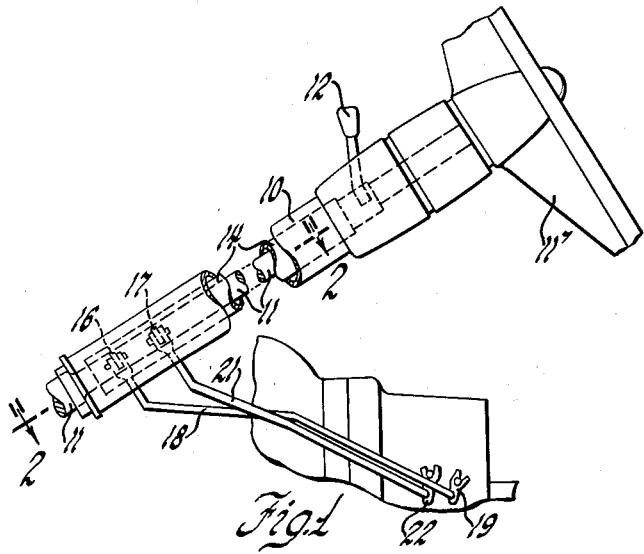
FIGURE 1 illustrates a steering column mounted transmission control assembly.

The invention is illustrated in a transmission control assembly mounted on a steering column 10 which supports the steering shaft 11 and steering wheel 11'. The transmission control lever 12 may be connected in any suitable manner, for example, as shown in the Primeau Patent 2,924,988, issued February 16, 1960, to control the control tube 14 for rotary and reciprocating movement. Hand lever 12 is rocked toward and away from the steering wheel 11 to reciprocate the control tube 14 for selecting movement and rotated about the axis of the steering column to rotate the control tube for shifting movement. The lower end of the control tube 14 is, on reciprocal or axial movement, selectively clutched to the lower lever 16 or upper lever 17. The lower lever 16 is connected by a rod 18 to the first-reverse shift arm 19 while the upper lever 17 is connected by a rod 21 to the second-third shift arm 22.

Figure 2:
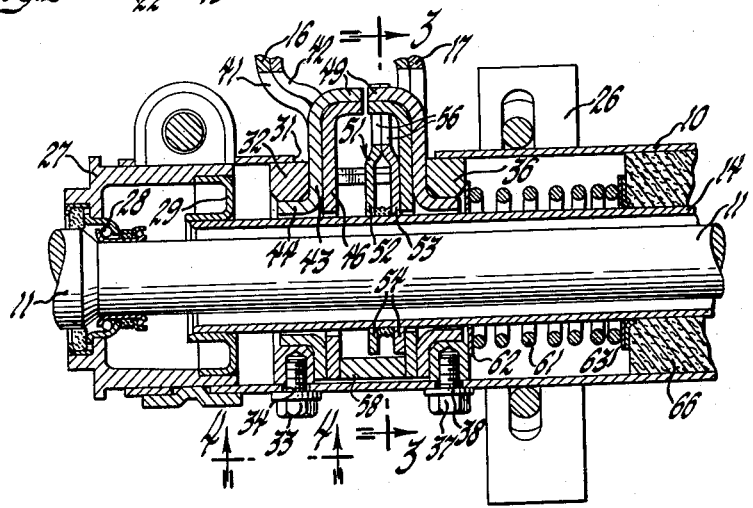
FIGURE 2 is a section taken along the line 2—2 of FIGURE 1 showing the lower end of the transmission control and clutching assembly.
Figure 3:
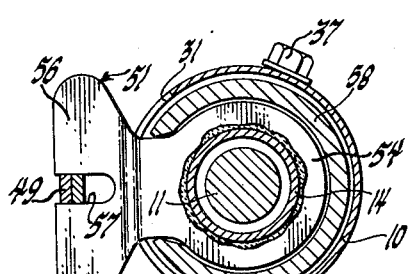
FIGURE 3 is a section of FIGURE 2 on the line 3—3.
Figure 4:
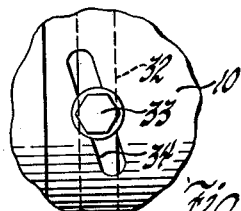
FIGURE 4 is a partial elevation of FIGURE 2.

Steering column 10 (FIGURE 2) has a bracket 26 to support the steering column on the vehicle. At the lower end, a bearing support member 27 is secured to column 10 to support the lower end bearing 28 for the steering shaft 11 and to support a bearing member 29 rotatably and reciprocally supporting the control tube 14.

Adjacent the lower end, the steering column 10 has a suitable aperture 31 having sufficient circumferential extent to permit limited rotation of the levers 16 and 17. At each side of the aperture 31 a bearing ring 32 and 36 is secured to the support tube or steering column 10. The lower bearing ring 32 is adjustably secured to the steering column by a plurality of bolts 33 passing through inclined slots 34 in the column. The bearing ring 32 may be rotated in the column 10 to provide an axial adjustment of the position of the bearing ring 32 in the column 10. The upper bearing ring 36 may be similarly secured by bolts 37 passing through holes 38 in the control tube for positive location in one position or inclined slots 38 in the control tube to permit positive location in axially adjusted positions.

Each of the levers 16 and 17 is formed of two stampings, a bearing portion 41 and a stiffening portion 42 suitably secured together by spot welding. The bearing portion 41 has an annular ring-like portion 43 in engagement with the inner side of the bearing ring and a cylindrical flange portion 44 in bearing engagement with the inner cylindrical surface of bearing ring 32. The stiffening portion 42 of levers 16 and 17 has at its inner end an annular ring-like portion 46. Both portions 41 and 42 of levers 16 and 17 are pierced with a U-shaped slot and the U portion bent outwardly to form the tabs or clutch teeth 49.

The clutch element 51 is formed by complementary plates 52 and 53 which are welded together. Each of the plates have an annular ring portion 54 surrounding and welded to the control tube. The ring portions are spaced to provide rigidity and to limit travel of shift tube 14 within engagement requirements of clutch dogs 49. Each of the plates 52 and 53 have a wing portion 56 having a centrally located slot 57 to receive the clutch dogs or teeth 49. A spacer ring 58 surrounding ring portions 54 engages the levers at each end to axially space the levers and maintain them in axial contact with the bearing rings.

A spring 61 is seated on a washer 62 abutting the ring 36 to anchor the spring to the support column 10. The spring resiliently engages a washer 63 secured to the control tube 14 to resiliently bias the tube to the upper position shown in which the clutch element 51 is in engagement with the lever 17. Upward movement of the control tube 14 is limited by the position of upper bearing 36 in control tube 10.

The control mechanism is illustrated in the normal position. The spring 61 biases the control tube 14 to this position where the clutch element 51 engages the clutch tooth 49 of lever 17. In this position, rotation of the control lever 14 will rotate the lever 17 to shift the transmission to either second or third speed. Axial movement of the control lever 14 in a downward direction will shift the clutch element 51 to engage the tooth 49 of lever 16. Then rotary movement of the control tube 14 will rotate the lever 16. The control tube is free to move axially in bearings located at the upper end of the steering column and the lower bearing 29. Since the levers 16 and 17 are fully supported on bearing rings 32 and 36 mounted on the supporting column 10, there is no sliding friction between the control tube 14 and the levers. The levers 16 and 17 are also rotatably mounted on heavy ring bearings 32 and 36 directly supported within the steering column or support tube 10 to provide a very rigid bearing support for the rotary movement of the control levers 16 and 17.

The above described preferred embodiment is illustrative of the invention which, as will be apparent to those skilled in the art, may be modified within the scope of the appended claims.

I claim:

1. In a control linkage, a tubular support column having an aperture, a control member mounted within said tubular support column, control member bearing means mounted on said support column to support said control member for rotary and reciprocal movement, a pair of shift levers, lever bearing means mounted on said tubular support member and rotatably supporting and axially locating said lever bearing means concentrically within said tubular support column between said control member and tubular support column, and clutch means selectively connecting said control member to said levers in response to axial movement of said control member to rotate the selected lever with said control member.

2. In a control linkage, a tubular support column having an aperture, a control member mounted within said tubular support column, control member bearing means mounted on said support column to support said control member for rotary and reciprocal movement about the control member axis, a pair of shift levers, lever bearing means mounted on said tubular support member and completely rotatably supporting and axially locating said lever bearing means within said tubular support column between said control member and tubular support column, and clutch means selectively connecting said control member to said levers in response to axial movement of said control member to rotate the selected lever with said control member.

3. In a control linkage, a tubular support column having an aperture, a control member mounted within said tubular support column, control member bearing means mounted on said support column to support said control member for rotary and reciprocal movement, a pair of shift levers, lever bearing means mounted on said tubular support member and rotatably supporting and axially locating said lever bearing means concentrically within and spaced from said tubular support column between said control member and tubular support column, and clutch means selectively connecting said control member to said levers in response to axial movement of said control member to rotate the selected lever with said control member.

4. In a control linkage, a tubular support column having an aperture, a control member mounted within said tubular support column, control member bearing means mounted on said support column to support said control member for rotary and reciprocal movement, a pair of levers having an annular bearing portion surrounding and spaced from said control member, lever bearing means mounted on said tubular support member engaging said annular bearing portions of said levers to rotatably support and axially locate said lever bearings means concentrically within said tubular support column between said control member and tubular support column, and clutch means selectively connecting said control member to said levers in response to axial movement of said control member to rotate the selected lever with said control member.

5. In a control linkage, a tubular support column having an aperture, a control member mounted within said tubular support column, control member bearing means mounted on said support column to support said control member for rotary and reciprocal movement, a pair of shift levers each having a bearing annulus having an external cylindrical bearing surface and thrust bearing surfaces, lever bearing means mounted on said tubular support member and contacting said cylindrical and thrust bearing surfaces to rotatably support and axially locate said levers concentrically with said control member between said control member and tubular support column, and clutch means selectively connecting said control member to said levers in response to axial movement of said control member to rotate the selected lever with said control member.

6. In a control linkage, a tubular support column having an aperture therein, a control member mounted within said tubular support column for rotary and reciprocal movement about the longitudinal axis of said control member, a hand lever mounted on said support column and operatively connected to said control member to rotate and reciprocate said control member, a pair of spaced bearing rings located inside and supported on said tubular support column on opposite sides of said aperture and each having an internal cylindrical bearing surface and facing annular bearing surfaces, a pair of control levers each having an external cylindrical bearing portion in bearing contact with said internal cylindrical bearing surfaces, outer annular bearing portions on each side, and a lever portion extending through said aperture, facing clutch dogs located on said levers, means to hold the outer bearing portions in contact with said annular bearing surfaces, and a clutch member fixed to said control member selectively engaging said clutch dog on each lever in response to axial movement and to rotate the selected lever on rotary movement.

7. In a control linkage, a tubular support column having an aperture therein, a control tube concentrically mounted within said tubular support column for rotary and reciprocal movement about the longitudinal axis of said control tube, a hand lever mounted on said support column and operatively connected to said control tube to rotate and reciprocate said control tube, a pair of spaced bearing rings located inside and supported on said tubular support column on opposite sides of said aperture and each having an internal cylindrical bearing surface and facing annular bearing surfaces, a pair of control levers each having an external cylindrical bearing portion in bearing contact with said internal cylindrical bearing surfaces, outer annular bearing portions on each side, and a lever portion extending through said aperture, facing clutch dogs located on said lever portions externally of said tubular column, means to hold the outer bearing portions in contact with said annular bearing surfaces, and a clutch member fixed to said control tube selectively engaging said clutch dog on each lever in response to axial movement and to rotate the selected lever on rotary movement.

8. In a control linkage, a tubular support column having an aperture therein, a control tube concentrically mounted within said tubular support column for rotary and reciprocal movement about the longitudinal axis of said control tube, a hand lever mounted on said support column and operatively connected to said control tube to rotate and reciprocate said control tube, a pair of spaced bearing rings located inside and supported on said tubular support column on opposite sides of said aperture and each having an internal cylindrical bearing surface and facing annular bearing surfaces, a pair of control levers each having an external cylindrical bearing portion in bearing contact with said internal cylindrical bearing surfaces, outer annular bearing portions on each side, and a lever portion extending through said aperture, and clutch dogs located on the facing sides of said levers, means to hold the outer bearing portions in contact with said annular bearing surfaces, and a clutch member fixed to said control tube selectively engaging said clutch dog on each lever in response to axial movement and to rotate the selected lever on rotary movement.

9. In a control linkage, a tubular support column having an aperture therein, a control tube concentrically mounted within said tubular support column for rotary and reciprocal movement about the longitudinal axis of said control tube, a hand lever mounted on said support column and operatively connected to said control tube to rotate and reciprocate said control tube, a pair of spaced bearing rings located inside and supported on said tubular support column on opposite sides of said aperture and each having an internal cylindrical bearing surface and facing annular bearing surfaces, a pair of control levers each having an external cylindrical bearing portion in bearing contact with said internal cylindrical bearing surfaces, inner and outer annular bearing portions on each side, and a lever portion extending through said aperture, facing clutch dogs located on said lever portions externally of said tubular column, a partial ring member located between said support column and control tube and contacting the facing inner annular bearing portion of each lever to hold the outer bearing portions in contact with said annular bearing surfaces, and a clutch member fixed to said control tube selectively engaging said clutch dog on each lever in response to axial movement and to rotate the selected lever on rotary movement.

References Cited in the file of this patent
UNITED STATES PATENTS

| | | |
|---|---|---|
| 2,532,170 | Jovanovich et al. | Nov. 28, 1950 |
| 2,631,467 | Lincoln et al. | Mar. 17, 1953 |
| 2,696,126 | Lincoln et al. | Dec. 7, 1957 |